United States Patent [19]
Lee

[11] 3,926,753
[45] Dec. 16, 1975

[54] ELECTROCHEMICAL REMOVAL OF FLUORIDE ION FROM AQUEOUS MEDIA

[75] Inventor: Sung Ki Lee, E. Amherst, N.Y.

[73] Assignee: Andco Incorporated, Buffalo, N.Y.

[22] Filed: Mar. 11, 1974

[21] Appl. No.: 449,825

Related U.S. Application Data

[63] Continuation-in-part of Ser. No. 332,884, Feb. 16, 1973, which is a continuation-in-part of Ser. No. 225,417, Feb. 11, 1972, Pat. No. 3,766,037.

[52] U.S. Cl. .................. 204/149; 204/130; 204/152
[51] Int. Cl.²............................................ C02B 1/82
[58] Field of Search.................... 204/149, 152, 130

[56] References Cited
UNITED STATES PATENTS

| | | | |
|---|---|---|---|
| 937,210 | 10/1909 | Harris................................ | 204/149 |
| 2,600,171 | 6/1952 | Sagen................................ | 204/97 X |
| 3,769,186 | 10/1973 | Ichiki et al........................ | 204/149 |
| 3,806,435 | 4/1974 | Ohta et al......................... | 204/149 |
| 3,816,276 | 6/1974 | Ichiki et al...................... | 204/149 X |

*Primary Examiner*—John H. Mack
*Assistant Examiner*—A. C. Prescott
*Attorney, Agent, or Firm*—Christel & Bean

[57] ABSTRACT

Contaminating fluroide ion is removed from an aqueous medium from industrial effluents, by an electrochemical method which includes formation of an insoluble aluminum fluoride compound or complex of the contaminant ion, utilizing an anode of aluminum, aluminum alloy or insoluble aluminum compound. The fluoride is changed to insoluble less toxic form. The method is applicable to the removal of other contaminant ions, e.g., suspended solids. Also described are electrolytic cells and apparatuses useful in effecting the method.

6 Claims, 5 Drawing Figures

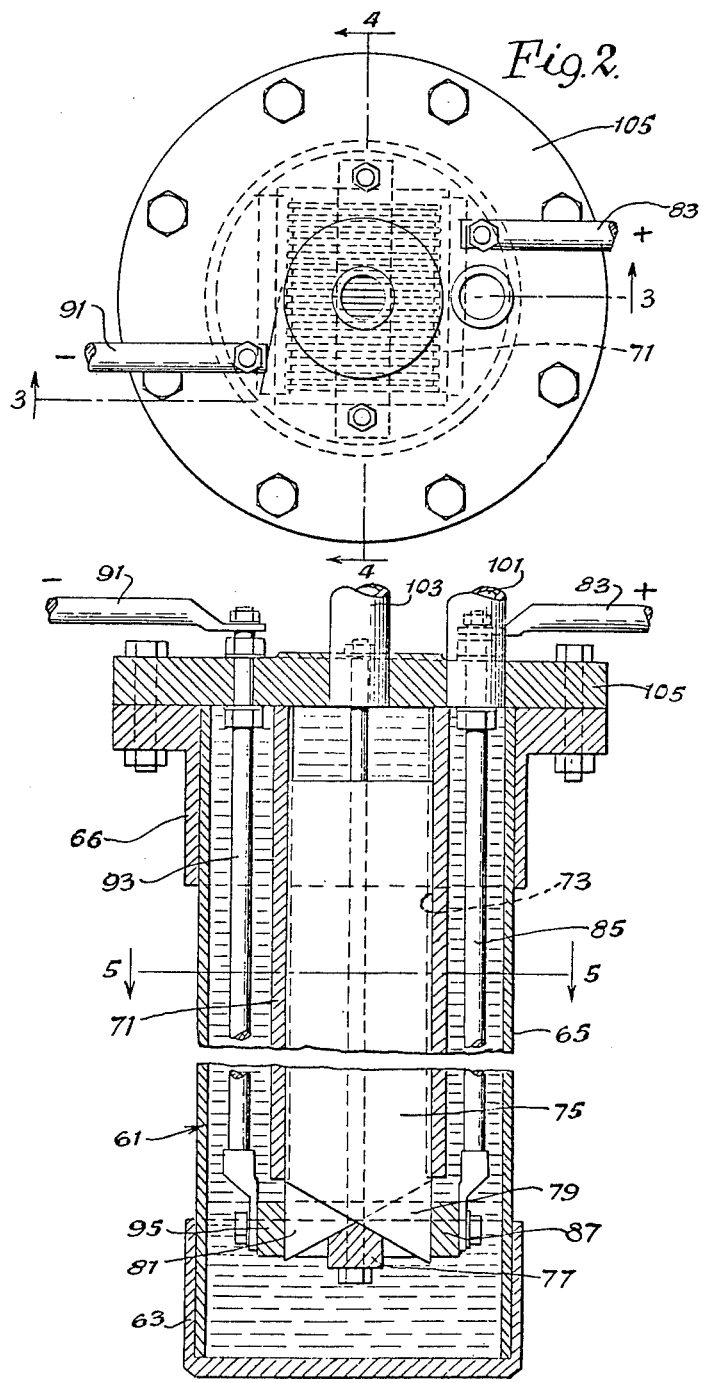

ELECTROCHEMICAL REMOVAL OF FLUORIDE ION FROM AQUEOUS MEDIA

CROSS REFERENCE TO A RELATED APPLICATION

This application is a continuation-in-part of my copending application Ser. No. 332,884 filed Feb. 16, 1973 and entitled "Electrochemical Contaminant Removal from Aqueous Media" which is a continuation-in-part of application Ser. No. 225,417, filed Feb. 11, 1972 now U.S. Pat. No. 3,766,037.

BACKGROUND OF THE INVENTION

This invention relates to methods for the treatment of liquids to remove contaminants or pollutants from them. More particularly, the invention is for the electrochemical treatment of spent processing solutions, rinse waters, e.g., plating rinses, waste water streams and effluent or purge streams, as from cooling towers and the wet scrubbing of contaminated gases, and the like. The invention also relates to electrolytic cell structures utilizing aluminum, aluminum alloys or insoluble aluminum compounds for anodes thereof.

Prior art methods for the removal of waste fluorides from liquid or aqueous media have included chemical precipitations, ion-exchange adsorption and alumina contact processes to convert the wastes to acceptable different compounds or to concentrate them and make them more readily disposable. The chemical processes often require the steps of acidification, to obtain low pH; chemical addition, to effect the reaction, such as precipitation to precipitate out the reaction products; and separation of the solid precipitate from the liquid. Industrial wastes containing high fluoride levels requires two-stage treatment. Line precipitation removes fluorides down to 10 to 20 mg/l. Further reduction can be accomplished down to 1 mgle. level requiring long contact of activated alumina, with alum regeneration. Such process requires higher capital cost and higher operating costs.

SUMMARY OF THE INVENTION

Now, however, by following the method of this invention, with no pH adjustment of the influent or effluent and no chemical additions, one can effectively remove ionic as well as nonionic contaminants by converting them to insoluble compounds. The insoluble aluminum compounds or complexes of contaminant ions such as fluorides formed with the electrode metal are readily removable from the aqueous medium in which they were originally present, facilitating purification of the medium.

In accordance with the present invention a method for electrochemically removing from an ionizing medium a contaminant fluoride ion which is capable of forming an insoluble aluminum compound, complex or co-precipitate comprises passing an electric current between an anode which has a surfact or a portion of a surface thereof of aluminum, aluminum alloy or insoluble aluminum compound, and a cathode through the ionizing medium containing the ion to be removed, so as to produce anodically an insoluble aluminum compound, species or complex while cathodically reacting with the aqueous medium to generate hydrogen and produce hydroxyl ion to form insoluble products, and removing such insoluble materials from the aqueous medium. In preferred embodiments of the invention the contaminant, which is initially toxic, is converted to non-toxic or less toxic form, which is insoluble, and is removed.

For example, the fluoride ion is changed to insoluble complexes and is removed as a complex of aluminum, which may also be thought of as a mixture of as a mixture of nonstoichiometric aluminum hydroxide and aluminum fluoride. Also within the invention are apparatuses, such as electrolytic cells, which include anodes having on their surfaces at least portions of aluminum, aluminum alloy or insoluble aluminum compound and which are of structures to facilitate continuous flow through them of aqueous media to be detoxified, while avoiding blockages or covering of the anodes with insulating insoluble reaction products.

The present invention is applicable to the treatment of various liquids containing aluminum-precipitatable, co-precipitatable or complex-forming impurities or toxicants, such as those liquids resulting from industrial metal finishing, chromate conversion coatings, chemical industries, paper mill effluents, sanitary and municipal sewage, aluminum manufacturing, etc. Brackish waters containing high fluoride and other toxic ions may also be treated by this method but primarily it is useful for removal of harmful ions such as fluorides. As a byproduct of the process, the harmful constitutents may often be recovered in useful form. Even if it is decided that it is uneconomic to utilize them as recovered, possibly because of the inclusion with them of various impurities, the solid forms are more readily disposed of than the dilute solutions of the toxicant initially present.

The present invention, in its most preferred forms, chemically complexes a toxic contaminant of a liquid medium to a less toxic form, e.g., fluoride to insoluble aluminum fluouride in flocculent form, that aids in removing the less toxic product by forming a complex with it or otherwise physically or chemically combining with it to form a removable solid, gel or flocculent material by the following synergistic reactions:

1. $Al(OH)_3$ and $Al_2(F)_6$ individually normally require a specific pH range for complete precipitation but in the presence of the aluminum complex of $Al_2(F)_6$ and $Al(OH)_3$ show less tendency to be so pH sensitive;

2. Complete co-precipitation is obtained over a much wider pH range; and due to the synergestic effects;

3. Complete precipitation is obtained in a shorter residence time. Such reactions can be effected utilizing dilute solutions of the contaminant to be treated and at reasonable pH's, near neutral. Prior methods more or less aimed at removing suspended solids of generating flocculents employed specific pH ranges.

The reaction of this invention does not require the presence of a diaphragm or other separator between the anode and cathode portions of the electrolytic cell, and because of the pH self-controlling feature of the invention, in many cases it does not require conductivity or pH adjustments.

Although the invention is directed primarily to the removal of toxic flouride contaminant from waste or process streams, it is also useful to remove compounds containing fluorine and phosphate wherein the soluble form, upon reduction, produces either an insoluble solid, preferably complex-forming with aluminum hydroxides or oxides, or a gas. Of course, in cases where the gas is also poisonous, provision will all be made for recovering it or chemically converting it to non-toxic or disposable form.

The various methods, apparatuses, operations, constructions, conditions, details, uses and advantages of the invention will be apparent from the following description taken in conjunction with the illustrative drawing of preferred embodiments of the apparatuses used to practice the method, in which drawing:

FIG. 2 is a top plan view of an electrochemical cell of the present invention for use in removal of contaminants from aqueous solutions;

FIG. 3 is a central vertical sectional view along plane 3—3 of FIG. 2;

Figure 1:
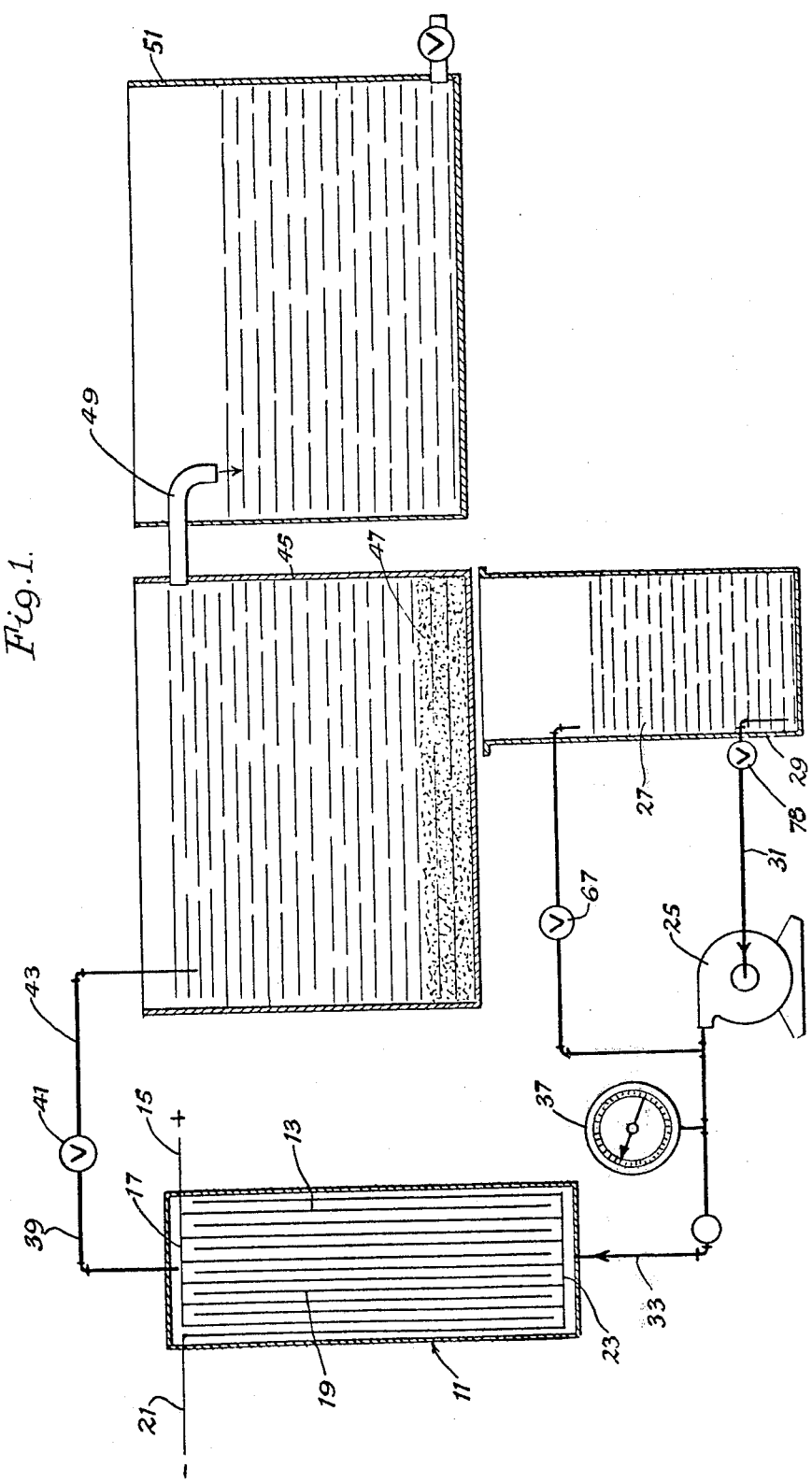
FIG. 1 is a schematic diagram of an apparatus for removing contaminants from liquids by the method of this invention.
Figure 4:
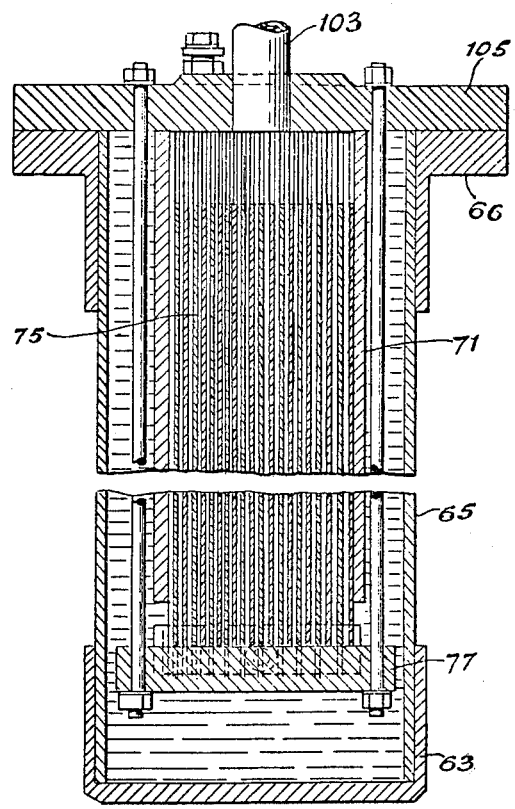
FIG. 4 is a central vertical sectional view along plane 4—4 of FIG. 2.
Figure 5:
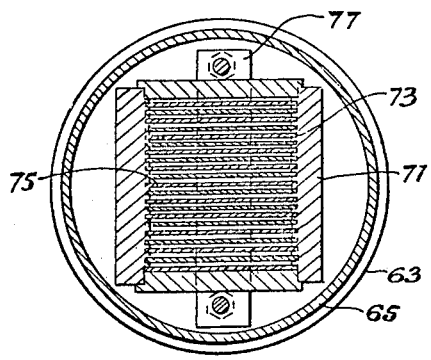
FIG. 5 is a horizontal sectional view along plane 5—5 of FIG. 3.

In FIG. 1, electrolytic cell 11 includes anodes 13 of aluminum, aluminum alloy, or insoluble aluminum compound connected to a source 15 of direct electric current through an anode bus 17, and cathodes 19, connected to a negative sink 21 through cathode bus 23. In the cell illustrated the anodes and cathodes are monopolar and a plurality of them is shown. However, different numbers of anode-cathode combinations may be employed, both greater and less, and bipolar, as well as unipolar arrangements can be used.

Pump 25 draws an aqueous liquid medium or solution 27 from tank 29 or other source through inlet line 31 and discharges it through line 33 to electrolytic cell 11. Flow meter 37 measures the flow of the solution containing contaminant to be removed so that the flow may be controlled by adjusting pump speed, valve 78 or proportion through valve 67. The solution, now containing insoluble derivative of the contaminant, e.g., aluminum hydroxide-aluminum flouride complex, in flocculent precipitate form, flows out of the cell through line 39 past valve 41, through line 43 into settling tank 45, where coagulant is added to coagulate the flocculents. The coagulum 47 is removed from the flowing solution stream by sedimentation. Next, the clarified solution passes through line 49 into storage tank 51 or other reservoir, or in some cases, through a disposal line connecting to a sewer, a recycle line or other suitable stream. Instead of utilizing a settling tank, in some instances it may be desirable to employ continuous filter means for removing the insoluble precipitate from the treated liquid.

In FIGS. 2–5 electrolytic cell 61 includes a cup-shaped base 63, a cylindrical central section 65 and a flanged upper portion 66, all joined together in liquid-tight relationship to serve as a container for electrolyte and the positioned electrodes. The container is principally made of polyvinyl chloride or chlorinated polyvinyl chloride but other plastics and inert materials of construction may also be utilized. Inside the cylindrical body is positioned a holder 71, grooved at a plurality of locations 73 to support the electrodes 75. The electrode holder 71 has an open bottom with a support 77 extending across it and supporting the angled electrodes, anodes 79 and cathodes 81. Electricity is carried to the anodes 79 by lead 83, connector 85 and strap or bus 87 while the connection to cathodes 81 is by means of lead 91, connector 93 and bus 95. Inlet 101 carries liquid into the cell and outlet 103 is for the effluent, including suspended insoluble material. Top flange 105 is joined to the cell body and serves to hold various other cell parts in position.

As illustrated, the electrolytic cell is of the monopolar type, with alternating electrodes of different sign. However, this may be modified to be a bipolar arrangement, in known manner.

In addition to removing the toxic contaminants previously mentioned, the present processes and apparatuses are capable of treating other ionizable fluorine-containing compounds which may accompany those mentioned. Included in this group are tungstates, silicates, fluorosilicates, and phosphates and various forms of such materials of higher and lower acidities and higher and lower oxidation levels, e.g., perborates, bisulfates, sesqui-silicates, etc. If the aluminum oxide or hydroxide complex of such material or an aluminum salt of it is less soluble than the concentration of the material in the medium to be treated, it will usually be removable by the process. Even in some cases where such materials are quite soluble, they tend to be sorbed by the flocculent reaction products and their concentrations are diminished.

The anodes will have the active surfaces thereof at least partially of a material which releases aluminum in the aqueous medium due to the action of the electric current. It is not essential that the aluminum donating compound or material should cover the entire surface of the anode but usually it will be at least 50% and preferably over 90% thereof and in most preferred cases the entire electrode will be of such material. Mixtures of aluminum, aluminum alloys and insoluble aluminum compounds may be employed. The cathodes are preferably also of aluminum, to facilitate their use as anodes when it is desirable to reverse current flow for cleaning purposes, to increase cell life, etc., but they may also be of other suitable electrode materials previously mentioned. Because the cathode is relatively inert with respect to removal of the contaminant ions from the aqueous medium being treated the nature of the cathode material is not critical but it should be compatible with the anode and the electrolyte and of course, should not interfere with the insolubilization of the soluble contaminant to be removed.

The electrolytic cell employed may be of any structure in which the electrodes are located in any suitable configuration and the electrodes may be either monopolar or bipolar. However, vertical stacks of monopolar aluminum electrodes in which each electrode is monolithic are preferred. Equivalent forms, such as screens, perforated curved sheets, mixtures of screens and perforated sheets, solid sheets, bars and shot may be used to promote the best flows. Also, electrodes of the different materials already mentioned may be employed and the anodes and cathodes may be the same or different. In some instances, it may be desired to utilize different materials for individual anodes or a plurality of such materials may be employed in an anode or cathode. The assembled electrolytic cell, with electrodes, frame, conductors, piping and seals in place, is usually sized to fit the particular application contemplated and sizes, clearances and designs may be varied, as is suitable.

The method of this invention may be applied in various concentrations of the anionic contaminant in ionizing medium. Generally, the proportion of such contaminant will be less than 1% in the medium although as much as 15% may sometimes be present. Normally, because of the limiting effects of the solubilities of the complexes and other insoluble derivatives of the contaminants the initial contaminant concentration will be no less than 0.03 parts per million. In most instances it will be from 1 to 5,000 p.p.m. The current density range, in amperes per square foot (ASF) will be within the 0.05 to 500 range, preferably 1 to 10 and more preferably 2 to 3 for both bipolar and unipolar arrangements. The voltage is usually from 0.1 to 50 volts, preferably 0.5 to 20 volts and most preferably from 5 to 15 volts in unipolar arrangement. The current is in the range of 0.5 to 20,000 amperes, preferably from 2 to 1,000 amperes per cell module and most preferably from 50 to 5000 amperes for unipolar. For bipolar cells the voltage range is 500 to 5,000 when the current is from 0.5 to 50 amperes. For unipolar configuration current will be high and voltage low whereas for bipolar cells the reverse will usually be true.

The pH is maintained within the range of about 4 to 11, more preferably from 6 to 10. It is recognized that it should be such that the insoluble derivative or complex of the contaminant form will have a solubility sufficiently low so that the treatment decreases its concentration in the aqueous medium and such decrease is usually to less than half the quantity initially present. Normally the concentration will be lowered to less than 5 p.p.m. and preferably to less than 1 p.p.m with decreases to less than 0.1 p.p.m., 0.01 p.p.m. and even to 0.00 p.p.m. not being uncommon. Of course, the pH, as well as the electrical conditions, can usually be adjusted or controlled to produce the most desirable removal of contaminant and such adjustments will depend on the nature of the contaminants. The temperature of the contaminated solutions to be treated will normally be within the 10° to 50°C. range, preferably about 15° to 30°C., and often will initially be ambient and will be raised by the electrolytic reaction about 2° to 20°C. above ambient.

Dwell time in the various apparatuses for the contaminated medium to be treated may vary widely, being as little as 0.001 minute to as long as an hour but normally at least five seconds or 0.1 minute is required. The dwell time is determined by the flow of electricity, with six coulombs being the theoretical amount and being found to be about the charge required to convert one milligram of fluoride ion to aluminum fluoride. When utilizing single pass continuous processes and electrolytic cells it is found that an excess of from 50 to 200% of electricity may often be required, generally being about 100%. After the insoluble contaminant compound or complex of aluminum has been made it may be filtered out or settled out from the effluent liquid from the cell by conventional means.

To help speed the separation of the insoluble complex from the liquid and to help remove other insoluble materials, after removal of the treated liquid from the electrochemical cell it may be further treated with a suitable polyelectrolyte or coagulant. Among the most useful of such materials are the polyfunctional polyelectrolytes and of these the most preferred are the water soluble polymers of my U.S. Pat. application Ser. No. 304,221 filed Nov. 6, 1972, entitled Water Soluble Polyfunctionalized Polymers of Alpha, Beta-Unsaturated Active Hydrogen-Containing Monomers, the disclosure of which application is included herein by reference.

The polyelectrolyte or other coagulant or flocculent treatment is preferably effected before any separation of flocculent or other insolubles from the effluent from the treatment cell or afterward. Such treatment may be repeated but usually only one is enough. The treated and separated effluent may be recycled to another or the same electrochemical cell for retreatment or may be cascaded to other such cells for subsequent treatments. In such case, polyelectrolyte or equivalent treatment may be employed to assist in removing the insolubles but usually it will be effected only after the final treatment or after the initial and final treatments.

The following examples serve to illustrate the invention but do not limit it. All parts are by weight and all temperatures are in °C. unless otherwise mentioned. The examples given are mostly with respect to the removal of low concentrations of fluoride in the form of complexed fluoride ion from waste waters because this is an important and difficult problem which has been solved by the present invention. Nevertheless, it is evident that many other impurities are also removable by the same or slightly modified methods.

EXAMPLE 1

To an apparatus of the type illustrated in FIGS. 2–3, having a volume of twenty gallons, equipped with multiplate aluminum anodes and cathodes and spacers of polyvinyl chloride, 0.03 inch thick, there is fed an aqueous solution containing fluoride ion corresponding to 25 p.p.m. of sodium fluoride. The flow of such solution is maintained at a rate of five gallons per minute. The pH of the incoming solution is 4.5 and the reaction is carried out without making any adjustments of pH by addition of acid, base or buffer, other than by the production of hydroxyl ions at the cathode. A DC voltage of ten volts is applied and the current flow is 50 amperes. The current density is 2 to 10 ASF and is preferably held at 2.5 ASF. The electrochemical reaction for the operation of this example takes 6 to 12 coulombs to reduce 1 mg. of sodium fluoride. For oxidations or reductions of other materials proportional quantities of electricity are used, according to Faraday's Law. The reaction is monitored by periodic withdrawls of samples of the aqeuous medium and by analyses using standard photoelectric means, as well as specific ion electrodes.

Upon analysis it is found that the fluoride content has been reduced to 0.001 p.p.m. Because of the excellent reduction in fluoride content the liquid medium is not cascaded to other cells nor is it recycled. Instead, it is directly dischargeable into waste streams. When the experiment is repeated, using as the contaminant liquid a rinse obtained from the plating of metals, similar excellent results are obtained. The following is a comparison of the initial and final concentrations of components of such a rinse.

|   | Initial Concentration (p.p.m.) | Final Concentration (p.p.m.) |
| --- | --- | --- |
| Sodium Fluoride | 25 | 0.001 |
| Iron | 0.4 | 0.001 |
| $SO_4$ | 120 | — |
| $SiF_4 + SiF_6$ | 15 | 0.01 |
| pH | 4.5 | 6.8 |

Table 1 presents a comparison between non-consumable electrodes such as carbon and consumable electrodes such as aluminum as they effect fluoride ion. The advantage of using the consumable aluminum electrode is apparent.

EFFECTS OF ELECTRODE MATERIAL ON FLUORIDE ION

| Electrode Material | Voltages | Amperages | Time | Fluoride Ion Concentration Before | After |
|---|---|---|---|---|---|
| Carbon | 5 volts | 0.05 amps | 1.6 hrs | 50.5 ppm | 50.1 ppm |
| Carbon | 15 | 0.15 | 1.6 | 60.2 | 59.1 |
| Aluminum | 5 | 0.13 | 0.5 | 55.2 | 0.2 |

It is therefore apparent that the present invention accomplishes its intended objects. While several embodiments of the invention have been described in detail, this is for the purpose of illustration not limitation.

I claim:

1. A method for electrochemically removing from an ionizing medium a fluoride ion which is capable of forming an insoluble aluminum compound or complex, which comprises passing an electric current between an anode which has a surface or a portion of a surface thereof of aluminum, aluminum alloy or insoluble aluminum compound, and a cathode, through the ionizing medium containing the fluoride ion to be removed, so as to produce an insoluble aluminum compound or complex with the fluoride ion, and removing such insoluble material from the ionizing medium.

2. A method according to claim 1, wherein the contaminant ion is fluoride ion.

3. A method according to claim 1 wherein the ion removed is a toxic ion, harmful to animal life, the ionizing medium is aqueous, the fluoride is at a concentration of 0.03 to 50,000 parts per million before production of insoluble aluminum compound or complex, the electric current is direct or essentially direct, the current density is from 0.05 to 500 ASF, the electrolyte communicates freely with the anode and cathode without the interposition of a diaphragm, the anode surface is of aluminum or aluminum alloy and the pH of the aqueous medium is in a range in which the solubility of the insoluble aluminum compound or complex with the fluoride ion is less than 5 p.p.m. in the aqueous medium.

4. A method according to claim 1 wherein the electric charge supplied is from about 100 to 500% of the theoretical charge to convert the fluoride present to insoluble aluminum compound or complex form.

5. A method according to claim 2 wherein the aqueous medium containing fluoride is continuously passed through an electrolytic cell, the electrodes of which are covered by the medium, the dwell time of the fluoride containing aqueous medium in the cell is from 0.001 minute to one hour, and the electrical energy input to the cell is from 2 to 5 Faradays per equivalent weight of contaminant ion reacted.

6. A method according to claim 1 wherein the aqueous medium containing fluoride to be removed is continuously passed through an electrolytic cell, the dwell time of the fluoride containing aqueous medium in the treating cell is from 0.1 min. to one hour, after completion of treatment, the treated medium is continuously removed from the cell, together with insoluble metal salt or complex of the fluoride ion and the pH of the effluent from the cell is regulated to be in the range of 4 to 11, at which pH essentially no soluble fluoride compound or complex is present, and the insoluble fluoride compound or complex is removed from the aqueous medium.

* * * * *

UNITED STATES PATENT AND TRADEMARK OFFICE
CERTIFICATE OF CORRECTION

PATENT NO. : 3,926,753
DATED : December 16, 1975
INVENTOR(S) : Sung Ki Lee

It is certified that error appears in the above-identified patent and that said Letters Patent are hereby corrected as shown below:

Claim 2 - Delete.

Claim "3" should be renumbered as Claim --2--.

Claim "4" should be renumbered as Claim --3--.

Claim "5" should be renumbered as Claim --4--; and on Line 1 the "2" should be changed to --1--.

Claim "6" should be renumbered as Claim --5--.

On the cover sheet, after the abstract, "6 Claims" should read -- 5 Claims --.

Signed and Sealed this fourth Day of May 1976

[SEAL]

Attest:

RUTH C. MASON
Attesting Officer

C. MARSHALL DANN
Commissioner of Patents and Trademarks